Nov. 18, 1969  A. J. PETERSEN ET AL  3,479,270

FLOW CELL ASSEMBLY

Filed Dec. 22, 1966

ARNE J. PETERSEN
JOHN T. TAYLOR
INVENTORS

BY Thomas L. Peterson

ATTORNEY 3,479,270
FLOW CELL ASSEMBLY
Arne J. Petersen, Balboa, and John T. Taylor, Orange, Calif., assignors to Beckman Instruments, Inc., a corporation of California
Filed Dec. 22, 1966, Ser. No. 603,909
Int. Cl. B01k 3/00
U.S. Cl. 204—195  11 Claims

ABSTRACT OF THE DISCLOSURE

A flow cell assembly for analyzing very small volumes of liquid samples, such as blood. The assembly includes a liquid analyzing electrode, such as a glass electrode, having a cylindrical member which is longitudinally positioned within a cylindrical recess of a nonconductive body. The cylindrical member has a sensing portion for analyzing the condition of the liquid sample in the recess. A helical thread is formed between the cylindrical member of the electrode and the wall of the recess to provide a predetermined path which the sample must follow from one end of the cell over the sensing portion of the electrode to the other end of the cell.

---

This invention relates generally to a flow cell assembly and, more particularly, to a flow cell assembly for measuring the condition of very small volumes of liquid samples.

It is often desirable to measure the condition of very small samples, such as samples of blood, with very low flow rates and flowing in very small passages or cannulae, and the like. Usually such measurements include the measuring of the hydrogen or sodium ion concentration of the sample and the partial pressure of carbon dioxide or oxygen of the blood. A typical flow cell for performing the aforementioned measurements on blood is disclosed in U.S. Patent No. 3,151,052 to Arthur et al. Such a flow cell comprises a block of nonconductive material having a cannula therethrough for conveying the liquid sample and a passage perpendicular to the cannula which holds a measuring electrode, such as a pH glass electrode. The electrode has a curved tip which forms a wall of a measuring zone in flow communication with the cannula. Such measuring zone has a diameter equal to the tip of the glass electrode so that the liquid sample may contact the entire sensitive surface of the electrode; consequently, the measuring zone is substantially larger than the cross sectional area of the cannula. While such flow cells have been generally acceptable for the measuring of various conditions of blood samples, they have the disadvantage that due to the relatively large measuring zone in contact with the sensing electrode, relatively large volumes of liquid sample are required and some sample retention occurs in the measuring zone, resulting in contamination by prior sample residues of the sample being analyzed. In addition, shifts in the output signal of the measuring electrode results from gas bubbles becoming entrapped at the electrode surface in the measuring zone.

The principal object of the present invention is to provide an improved flow cell assembly requiring only very small liquid sample volumes and which produces minimum sample and gas bubble retention in the cell.

According to the principal aspect of the present invention, a flow cell assembly is provided comprising a block of nonconductive material with a cylindrical recess therein and a measuring electrode with a cylindrical member having a sensing portion for measuring the condition of the liquid sample in the recess. The measuring electrode is mounted in the block with said cylindrical member extending longitudinally into the recess. A helical thread is formed between the cylindrical member of the measuring electrode and the wall of the recess of the nonconductive block of the flow cell providing a predetermined path which the sample must follow from the one end of the cell over the sensing portion of the measuring electrode to the other end of the cell. By this arrangement, the sample introduced into the cell, as it flows in a helical path provided by the threads, pushes all previous sample or wash solution out ahead of it leaving no contaminants and, because the sample completely fills and follows the helical path, no gas bubble entrapment occurs in the flow cell, thus overcoming the disadvantages of prior flow cell assemblies. Moreover, the volume of the sample required in the flow cell assembly of the invention is smaller than that required in previous flow cells.

Other objects, aspects and advantages will become apparent from the following description taken in connection with the accompanying drawings wherein.

Figure 1:
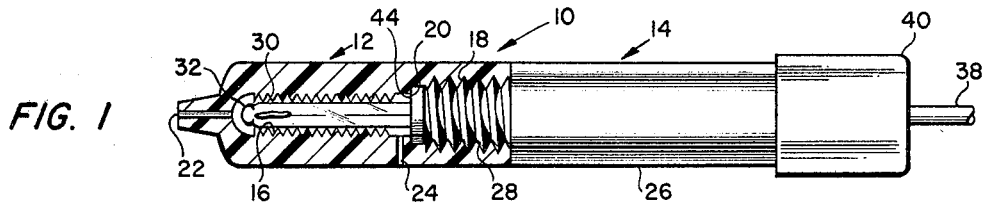
FIG. 1 illustrates one form of the flow cell assembly of the invention with the flow cell shown in longitudinal cross section and assembled to the measuring electrode which is shown in side elevation.
Figure 2:
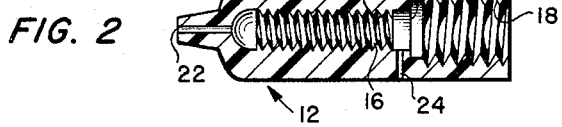
FIG. 2 illustrates the flow cell of FIG. 1 in longitudinal cross section.
Figure 3:
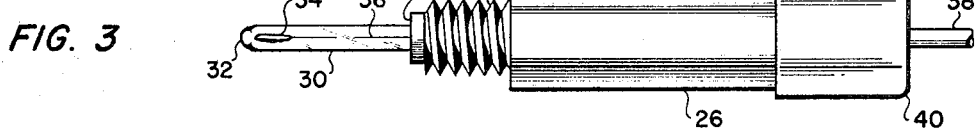
FIG. 3 shows the measuring electrode of FIG. 1 in side elevation.
Figure 4:
FIG. 4 shows another form of the flow cell assembly of the invention with the flow cell in longitudinal cross section and assembled to another type of measuring electrode, shown in side elevation.

Referring now to the drawings in detail, wherein like reference characters designate like or corresponding parts throughout the various views, there is illustrated in FIGS. 1 to 3 one form of the flow cell assembly of the invention, generally designated by the numeral 10. The assembly includes two parts, a flow cell 12 and a measuring electrode 14. The flow cell 12 comprises a member of nonconductive material which is nonpermeable to gases, nonabsorbing of the liquid sample or its constituents, and somewhat resilient, such as silicone rubber or other elastomeric material.

The cell 12 has a cylindrical recess 16 therein having an enlarged diameter portion 18 with screw threads formed therein. An annular shoulder 20 is formed between the cylindrical recess 16 and the threaded portion 18. An opening 22 is provided in the forward portion of the cell 12 with its longitudinal axis coaxial with the longitudinal axis of the cylindrical recess 16. A second opening 24 passes through the wall of the cell 12 at the rear portion of the recess 16 adjacent to the annular shoulder 20.

The measuring electrode 14, as best seen in FIG. 3, is illustrated as being a glass electrode of the type used for measuring the ion concentration of solutions, such as hydrogen, sodium or potassium ions. The electrode 14 comprises a main body portion 26, a screw threaded portion 28 and an elongated cylindrical tube 30 of nonconductive glass at the forward portion of the electrode. The end of the tube 30 is closed by a barrier 32 of ion sensitive glass which forms the sensing portion of the electrode. An internal half cell 34 is immersed in an electrolyte filling the tube 30. The half cell is connected via a conductor 36 to a cable extending from a cap 40 at the rear of the electrode. The glass electrode 14 is connected to a suitable high impedance amplifier, such as a pH meter, together with a reference electrode (not shown) which may be in contact with the sample solution at either of the openings 22 or 24 in a manner well known in the art.

As seen in FIG. 1, when the electrode 14 is screw threaded into the threaded passage 18 at the rear of the flow cell 12, the annular surface 44 at the forward end of the threaded portion 28 of the main body of the electrode abuts against the annular shoulder 20 thereby sealing the end of the recess 16 in the flow cell.

In accordance with an important feature of the present invention, a helical thread is provided in the wall of the cylindrical recess 16 of the cell 12 so that when the measuring electrode 14 is mounted in the cell 12, as illustrated in FIG. 1, the threads 42 formed in the recess but against the surface of the glass tube 30 in liquid-sealing relationship therewith so as to provide a continuous helical path along the length of the cell 12. Generally the liquid sample is introduced into the cell via the opening 22 by means of a syringe forcing the sample through the helical path provided by the threads 42 outwardly through the opening 24 at the rear of the recess 16. However, it is understood that the sample could be introduced into the flow cell through the opening 24 in which case the fluid would exit through the opening 22 at the forward end of the assembly. Also, the sample may be drawn through the flow cell by drawing a vacuum at either of the openings 22 or 24 rather than forcing the sample therethrough by means of a syringe.

Figure 5:
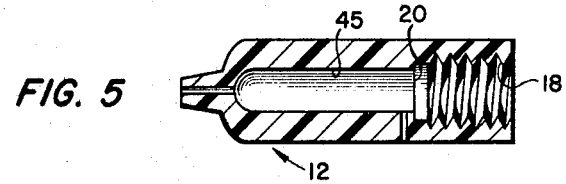
FIG. 5 shows the flow cell of FIG. 4 in longitudinal cross section.

Reference is now made to FIGS. 4 to 8 which illustrate a further form of the invention. In this embodiment of the invention, as best seen in FIG. 5, the cylindrical recess 45 of the flow cell 12 has a smooth cylindrical surface rather than being screw threaded as in the flow cell in FIG. 2. In this embodiment, the material of cell 12 need not be resilient and preferably is a transparent or semitransparent material which permits visual observation of the liquid flowing through the cell. Such a material is Lucite.

Figure 6:
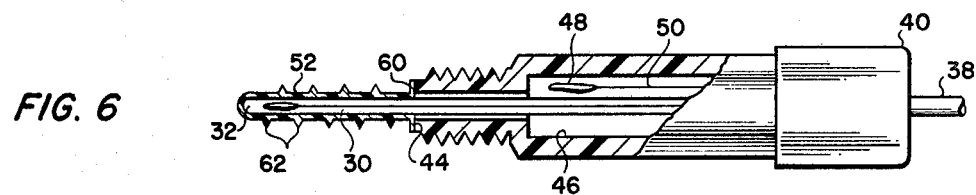
FIG. 6 shows the measuring electrode of FIG. 4 in partial longitudinal cross section.

FIG. 6 illustrates one form of an electrode which may be utilized in connection with the flow cell in FIG. 5. The electrode has generally the same configuration as that illustrated in FIG. 3 except that it incorporates, besides a glass electrode, a reference electrode joined to the glass electrode by an electrolyte and a selectively permeable membrane separates the electrodes from the liquid sample. Such an electrode, as well known in the art, is utilized for measuring the carbon dioxide content of a liquid sample where the membrane is permeable to carbon dioxide and impermeable to the electrolyte and species in the sample which would interfere in the electrochemical measurement of the electrode. As in the electrode in FIG. 3, the electrode illustrated in FIG. 6 includes a cylindrical glass tube 30 terminating at its end with an ion sensitive glass barrier 32. The body portion 26 of the electrode has a recess 46 in which there is positioned a reference electrode 48 having a conductor 50 passing through the cap 40 into the cable 38 whereby the reference electrode 48, together with the internal half cell 34 of the glass electrode may be connected to a high impedance amplifier.

A membrane 52 having an elongated cylindrical portion 54, a closed end 56 and an open end 58 covers the glass tube 30 and barrier 32 of the glass electrode. The membrane has an outwardly extending annular flange 60 adjacent to its open end 58 for closing the recess 46 of the body 26 of the electrode as best seen in FIG. 6. The recess 46 is filled with a bicarbonate solution. The surface of the tube 30 and barrier 32 are also covered with a film of the solution so as to electrolytically join the barrier 32 and the reference electrode 48.

Figures 7, 8:
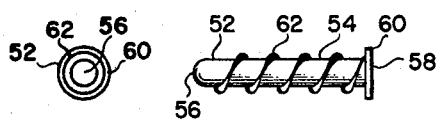
FIG. 7 illustrates in side elevation a membrane with helical threads as used in the measuring electrode of FIG. 6.
FIG. 8 is an end view of the membrane of FIG. 7.

As best seen in FIG. 7, the membrane 52 is provided with a helical thread 62 in its outer surface which is integral with the cylindrical portion 54 of the membrane.

The membrane may be cast from a resilient material such as silicone rubber, Teflon or other suitable plastic, with the threads formed in the surface as illustrated.

When the electrode of FIG. 6 is mounted in the flow cell of FIG. 5, with the threads 28 of the electrode engaging the threads 18 of the flow cell, the annular surface 44 of the electrode body forces the annular flange 60 of the membrane against the shoulder 20 of the flow cell to seal the bicarbonate solution within the recess 46 of the electrode. This seal also prevents the leakage of sample past the end of the cylindrical recess 45 of the flow cell thereby providing a closed path between the opening 22, the helical path provided by the threads 62 on the membrane and the opening 24 of the cell. It is understood that the threads formed in the membrane 52 have an outer diameter such that the threads abut the smooth cylindrical surface of the recess 45 of the flow cell in liquid-sealing relationship.

The threads 62 on the membrane 52 not only provide a helical path for the fluid sample, thereby minimizing sample hold up and gas bubble retention in the flow cell, the threads also centrally position the glass tube 30 in the recess 45 so that the forward portion of the membrane will not contact the wall of the recess. Without the threads on the membrane 62, because the glass tube 30 is not rigidly mounted in the body 26 of the electrode, the end of the tube covered by the membrane could contact the wall of the cell resulting in the retention of sample at the point of contact. Also, if the membrane directly contacted the wall, causing the membrane to contact the barrier 32 so that bicarbonate solution is squeezed out from the space between the membrane and barrier leaving a dry area on the barrier, the output signal of the electrode would diminish or vary.

Flow cell assemblies as described herein have been constructed and tested successfully for very small sample size on the order of about 50 to 200 microliters. There was a minimum retention of previous sample or wash solution in the cells and a total sweep out of gas bubbles in the cells. This conclusion is based upon a visual inspection of blood and other liquid samples passing through a transparent Lucite flow cell of the type illustrated in FIGS. 4 and 5, by observation of the output signals of the electrodes in both assemblies described hereinabove which would indicate erratic behavior resulting from bubbles in the flow path and by observation of the shortened shift in the output signals of the electrodes in comparison to electrodes in previous forms of flow cells, which shift is due to sample retention in the flow path.

While the invention has been described in connection with the use of pH and $CO_2$ measuring electrodes, it is understood that other forms of measuring electrodes could also be utilized. For example, a polarographic oxygen measuring electrode may be utilized of the type generally described in U.S. Patent No. 2,913,386 to Clark. This type of electrode comprises an anode and a cathode joined by an electrolyte and separated from the sample medium by a selectively permeable membrane. When a suitable polarizing voltage is developed between the electrodes, either due to the choice of the electrode materials or by an external power source, oxygen diffusing through the membrane is reduced at the cathode of the electrode, producing a signal which is the function of the partial pressure of oxygen of the sample medium. The electrode illustrated in FIG. 6 could be readily modified to measure the oxygen partial pressure of a sample by substituting a platinum wire for the internal half cell 34. The wire would be sealed in the end of the glass tube 30 with its end flush with the end of the tube. The reference electrode 48 would be replaced by a silver wire which would form the anode of the polarographic oxygen sensor. The electrodes would be joined by a suitable electrolyte, such as KCl. Such an electrode assembly would incorporate a membrane of the same form and material as membrane 52.

Although several embodiments of the invention have been disclosed herein for the purpose of illustration, it will be understood that various changes can be made in the form, details, arrangement and proportions of the various parts in such embodiments without departing from the spirit and scope of the invention as defined by the appended claims.

What is claimed is:

1. In a flow cell assembly for measuring the condition of a liquid sample, the combination of:
    a number of nonconductive material having a cylindrical recess therein;
    measuring means including an ion measuring glass electrode, said electrode including an elongated cylindrical glass member having a section of ion sensitive glass;
    said measuring means being mounted in said nonconductive member with said cylindrical member extending into said recess and the longitudinal axis of said cylindrical member being coaxial with the longitudinal axis of said recess;
    helical thread means between said members defining a helical path for flow of said liquid sample through said recess; and
    liquid inlet and outlet openings in said nonconductive member in communication with opposite ends of said helical path.

2. A flow cell assembly as set forth in claim 1 wherein said helical threads means is a helical thread formed in the wall of said recess.

3. A flow cell assembly as set forth in claim 2 wherein said helical thread abuts the wall of said cylindrical member in liquid-sealing relationship therewith.

4. A flow cell assembly as set forth in claim 1 wherein one of said openings has a cross-sectional area smaller than that of said recess and is disposed with its longitudinal axis coaxial with the longitudinal axis of said recess.

5. A flow cell assembly as set forth in claim 4 wherein said section of ion sensitive glass is disposed closely adjacent to said one of said openings.

6. A flow cell assembly as set forth in claim 1 wherein said measuring means is a carbon dioxide measuring electrode including said glass electrode and a reference electrode joined by an electrolyte and separated from the liquid sample by a selectively permeable membrane; and
    said membrane covering said cylindrical member with said helical thread means being formed in the outer surface of said membrane.

7. A measuring electrode comprising:
    a body of nonconductive material having a recess therein;
    a first electrode having a portion mounted in said recess with an elongated tube of nonconductive material extending outside said recess, said first electrode having a sensing portion in said elongated tube;
    a second electrode in said recess adapted to be joined to said sensing portion by an electrolyte; and
    a selectively permeable membrane in the form of a cylinder with a closed end covering said elongated tube, the cylindrical portion of said membrane having a helical thread formed in its outer surface.

8. A measuring electrode as set forth in claim 7 wherein said membrane has an outwardly extending annular flange at the end thereof opposite said closed end closing said recess in said body.

9. In a flow cell assembly for measuring the condition of a liquid sample, the combination of:
    a member of nonconductive material having a cylindrical recess therein;
    measuring means having a cylindrical member with a sensing portion for measuring the condition of a liquid sample in said recess;
    said measuring means being mounted in said nonconductive member with said cylindrical member extending into said recess and the longitudinal axis of said cylindrical member being coaxial with the longitudinal axis of said recess;
    helical thread means between said members defining a helical path for flow of said liquid sample through said recess;
    liquid inlet and outlet openings in said nonconductive member in communication with opposite ends of said helical path;
    said measuring means comprising a pair of electrodes joined by an electrolyte and separated from the liquid sample by a selectively permeable membrane;
    an elongated tube of nonconductive material forming a portion of said cylindrical member with one of said electrodes terminating at the end of said tube forming said sensing portion; and
    said membrane covering said elongated tube of nonconductive material and said sensing portion with said helical threads being formed in the outer surface of said membrane.

10. A flow cell assembly as set forth in claim 9 wherein said recess has an enlarged diameter portion at one end of said nonconductive member providing an annular shoulder between said recess and enlarged diameter portion;
    said membrane having an outwardly extending annular flange at one end thereof bearing against said shoulder; and
    said measuring means being screwthreaded into said enlarged diameter portion and having an annular surface sealing said flange against said annular shoulder.

11. A flow cell as set forth in claim 9 wherein the outer periphery of said helical threads engage the cylindrical wall of said recess in liquid-sealing relationship therewith.

References Cited

UNITED STATES PATENTS

| | | | |
|---|---|---|---|
| 2,830,945 | 4/1958 | Keidel | 204—195 |
| 2,844,532 | 7/1958 | White et al. | 204—195 |
| 3,151,052 | 9/1964 | Arthur et al. | 204—295 |
| 3,188,285 | 6/1965 | Watanabe et al. | 204—195 |
| 3,208,926 | 9/1965 | Eckfeldt | 204—195 |
| 3,272,725 | 9/1966 | Garst | 204—1.1 |

JOHN H. MACK, Primary Examiner

T. TUNG, Assistant Examiner

U.S. Cl. X.R.

204—275